United States Patent
Mowatt et al.

(10) Patent No.: US 10,242,069 B2
(45) Date of Patent: Mar. 26, 2019

(54) ENHANCED TEMPLATE CURATING

(71) Applicant: Microsoft Technology Licensing, LLC, Redmond, WA (US)

(72) Inventors: David Mowatt, County Dublin (IE); Alexei Soloveitchik, Dublin (IE); Hubert Gezikiewicz, Dublin (IE); Philip Harney, Malahide (IE); Rebecca Anne Robinson, Mercer Island, WA (US); Stephanie Krieger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 417 days.

(21) Appl. No.: 14/656,954

(22) Filed: Mar. 13, 2015

(65) Prior Publication Data
US 2016/0267087 A1 Sep. 15, 2016

(51) Int. Cl.
*G06F 17/24* (2006.01)
*G06F 17/30* (2006.01)
*G06Q 10/10* (2012.01)

(52) U.S. Cl.
CPC .... *G06F 17/3053* (2013.01); *G06F 17/30554* (2013.01); *G06Q 10/10* (2013.01); *G06F 17/248* (2013.01)

(58) Field of Classification Search
CPC .............. G06F 17/248; G06F 17/3053; G06F 17/30554; G06Q 10/10
See application file for complete search history.

(56) References Cited

U.S. PATENT DOCUMENTS

| | | | |
|---|---|---|---|
| 7,412,659 B2 | 8/2008 | Wessling et al. | |
| 7,484,180 B2 | 1/2009 | McCormack et al. | |
| 7,581,206 B2 | 8/2009 | Saad et al. | |
| 7,668,619 B2 | 2/2010 | Torian | |
| 8,406,461 B2 | 3/2013 | Cok | |
| 8,554,650 B1 | 10/2013 | Bernard et al. | |
| 8,713,419 B2 | 4/2014 | Malone et al. | |
| 8,965,998 B1 * | 2/2015 | Dicker | G06N 99/005 705/26.5 |
| 9,244,917 B1 * | 1/2016 | Sharma | G06F 17/30905 |
| 2002/0184233 A1 | 12/2002 | Schneider | |
| 2003/0018622 A1 | 1/2003 | Chau | |
| 2007/0027861 A1 | 2/2007 | Huentelman et al. | |

(Continued)

OTHER PUBLICATIONS

"Second Written Opinion Issued in PCT Application No. PCT/US2016/021894", dated Jan. 31, 2017, 6 Pages.

(Continued)

*Primary Examiner* — Jorge A Casanova

(57) ABSTRACT

Systems, methods, and software are disclosed herein for curating templates. In an implementation, templates are annotated with information that describes various factors descriptive that describe perceived qualities of the templates. A templates service automatically ranks the templates based on the factors, including functional and aesthetic factors, as well as a randomizing factor. A determination is then made about which of the collection of templates to include in a gallery set that is downloaded to local applications. The templates service replies to requests for the gallery set with results comprising graphical representations of the templates included in the gallery set.

20 Claims, 11 Drawing Sheets

(56) References Cited

U.S. PATENT DOCUMENTS

| | | | |
|---|---|---|---|
| 2007/0079236 A1 | 4/2007 | Schrier et al. | |
| 2009/0132598 A1* | 5/2009 | DeHaan | G06F 19/325 |
| 2009/0281870 A1* | 11/2009 | Sun | G06Q 10/10 |
| | | | 705/7.29 |
| 2011/0157227 A1* | 6/2011 | Ptucha | H04N 5/232 |
| | | | 345/638 |
| 2011/0280476 A1* | 11/2011 | Berger | G06F 17/30274 |
| | | | 382/163 |
| 2012/0131020 A1* | 5/2012 | Nitz | G06F 17/2785 |
| | | | 707/749 |
| 2013/0185630 A1 | 7/2013 | Ahmadullin et al. | |
| 2013/0198733 A1 | 8/2013 | Farrell et al. | |
| 2013/0304607 A1 | 11/2013 | Costa et al. | |
| 2014/0013212 A1 | 1/2014 | Von Haden et al. | |
| 2015/0019958 A1 | 1/2015 | Ying et al. | |
| 2015/0278371 A1* | 10/2015 | Anand | G06F 17/3053 |
| | | | 707/723 |

OTHER PUBLICATIONS

"International Search Report & Written Opinion Received for PCT Application No. PCT/US2016/021894 ", dated Jun. 7, 2016, 12 Pages.

"Creating BI Publisher Layout Templates", Published on: Jun. 30, 2013 Available at: http://docs.oracle.com/cd/E28280_01/bi.1111/e22254/create_lay_tmpl.htm#BIPRD2132.

"International Preliminary Report on Patentability Issued in PCT Application No. PCT/US2016/021894", dated May 31, 2017, 7 Pages.

* cited by examiner

| ID | Functional Scr. | Aesthetic Scr. | Score | Rank | Random No. | Score | Rank |
|---|---|---|---|---|---|---|---|
| 401 | .7 | .5 | 1.2 | 3 | .1 | 1.3 | 7 |
| 402 | .8 | .1 | .9 | 7 | .3 | 1.2 | 9 |
| 403 | .4 | .9 | 1.3 | 2 | .6 | 1.9 | 2 |
| 404 | .7 | .3 | 1.0 | 5 | .6 | 1.6 | 6 |
| 405 | .2 | .7 | .9 | 8 | .8 | 1.7 | 4 |
| 406 | .5 | .2 | .7 | 10 | .2 | .9 | 10 |
| 407 | .6 | .4 | 1.0 | 6 | .9 | 1.9 | 3 |
| 408 | .8 | .8 | 1.6 | 1 | .4 | 2.0 | 1 |
| 409 | .5 | .3 | .8 | 11 | .5 | 1.3 | 8 |
| 410 | .2 | .3 | .5 | 12 | .2 | .7 | 12 |
| 411 | .1 | .9 | 1.0 | 4 | .7 | 1.7 | 5 |
| 412 | .1 | .7 | .8 | 9 | .1 | .9 | 11 |

FIGURE 5A

| ID | Functional Scr. | Aesthetic Scr. | Score | Rank | Random No. | Score | Rank |
|---|---|---|---|---|---|---|---|
| 401 | .7 | .5 | 1.2 | 3 | .6 | 1.8 | 4 |
| 402 | .8 | .1 | .9 | 7 | .1 | 1.0 | 9 |
| 403 | .4 | .9 | 1.3 | 2 | .9 | 2.2 | 1 |
| 404 | .7 | .3 | 1.0 | 5 | .8 | 1.8 | 2 |
| 405 | .2 | .7 | .9 | 8 | .5 | 1.4 | 7 |
| 406 | .5 | .2 | .7 | 10 | .4 | 1.1 | 8 |
| 407 | .6 | .4 | 1.0 | 6 | .7 | 1.7 | 5 |
| 408 | .8 | .8 | 1.6 | 1 | .2 | 1.8 | 3 |
| 409 | .5 | .3 | .8 | 11 | .7 | 1.5 | 6 |
| 410 | .2 | .3 | .5 | 12 | .1 | .6 | 12 |
| 411 | .1 | .9 | 1.0 | 4 | .8 | .9 | 10 |
| 412 | .1 | .7 | .8 | 9 | .1 | .9 | 11 |

ENHANCED TEMPLATE CURATING

TECHNICAL BACKGROUND

Many software applications provide template galleries in which a user can browse, search, and open templates. Template galleries allow users to more quickly accomplish a task or improve their work product. In addition, template galleries give software developers an opportunity to showcase features of their applications. A user may encounter a template gallery when, for example, the user navigates to open a new word processing document, spreadsheet, presentation, or other such content.

Hundreds of templates, if not thousands or more, may be available from which to select those templates that are displayed in the splash page of a gallery. The limited visual real estate in the first page of a gallery generally means that some organizing principal be applied when selecting the gallery set. Such input is typically provided by personnel that manually evaluate and select which templates belong in the gallery set based on a variety of factors, including the functional and aesthetic qualifies of a template.

When applications launch, they communicate with an online templates service to obtain the manually curated gallery set. The local applications then render gallery views with graphical representations of the templates included therein.

Overview

Technology is disclosed herein that enhances the template curation process. In an implementation, templates are annotated with information indicative of various factors related to perceived qualities of the templates. A templates service automatically ranks the templates based on the factors, including functional and aesthetic factors, as well as a randomizing factor. A determination is then made about which of the collection of templates to include in a gallery set that is downloaded to local applications. The templates service replies to requests for the gallery set with results comprising graphical representations of the templates in the gallery set.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 5A illustrates a table used to rank templates in an implementation.

TECHNICAL DISCLOSURE

Figure 1:
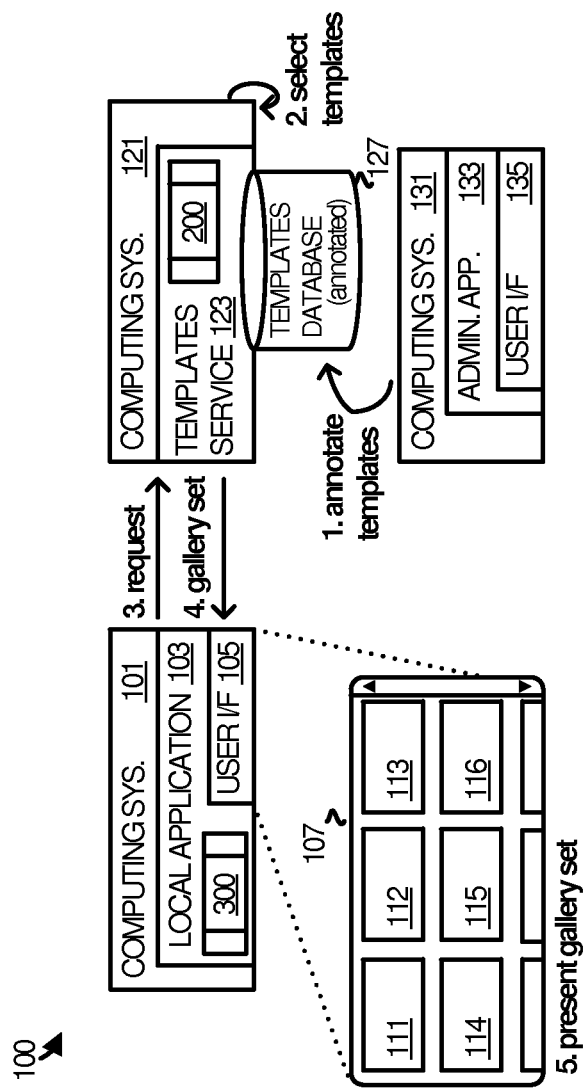
FIG. 1 illustrates an operational architecture and associated scenario in which enhanced template curating may be employed.

Technology is disclosed herein for automatically curating templates for display in template galleries. A templates service ranks a collection of templates in order based on factors associated with each template, including a functional factor, an aesthetic factor, and a randomizing factor. Prior to ranking, the templates are systematically annotated with information indicative of the functional factor and the aesthetic factor. The randomizing factor is ascertained each time ranking is performed, so as to introduce variability into the ranking process and variety into a resulting gallery set.

After ranking the collection of templates, the templates service determines which templates of the collection of templates to include in the gallery set based on a position of each of the collection of templates in the order they were ranked. As requests are received by the templates service from local applications, the templates service replies with the gallery set. The gallery set may comprise graphical representations of the templates included in the gallery set, the actual templates in their entirety, or both.

Ranking the templates may include obtaining a score for each of the collection of templates based on the various factors and ranking them in order based on the score obtained for each template. In some implementations, the templates service obtains or calculates an initial score based on the functional factor and the aesthetic factor and adds the randomizing factor to the initial score to produce the score. In some implementations, the initial score may be a value in a range of possible scores and the randomizing factor another value in the range of possible scores, such that the score cannot exceed two times that of an upper most value in the range of possible scores. This ensures that the randomizing factor does not overwhelm the other annotated factors. However, a larger range of possible scores could be used for the randomizing factor, especially in situations where greater weight is desired for the randomizing factor.

A demand factor is another factor that may be considered when scoring and ranking the templates. Examples of the demand factor include seasonal, quarterly, and daily demand figures for a particular template, as well as all-time demand for the template. The templates service can factor in demand for a given template when determining whether or not to include it in the gallery set.

In some implementations, the functional factor is a numerical rating representative of a level of functionality provided by the template. The aesthetic factor may comprise a numerical rating representative of a level of aesthetic quality achieved by the template. The demand factor may also be a numerical rating representative of a forecasted level of demand for the template. The randomizing factor may be a random number or a pseudo random number.

Various dimensions or measurements of demand may be used to arrive the demand factors. Examples of how demand may be measured include maintaining a count of the number of times a template is downloaded and counting the number of times a template is turned into a document which is saved or printed.

Demand may also be captured in terms of demand for the features and functionality expressed in a given template. How often various features of a template are carried forward or used by a user when working outside of the template can be monitored and represented in the demand factor for a given template. In an example, a template may include pivot table features and advanced font formatting features. A user's usage of such features before having experienced the template and after having experienced the template can be compared to arrive at an understanding of a feature-level demand for that template.

A category demand factor may be considered by the templates service in some implementations. The category demand factor may be a numerical rating representative of a forecasted level of demand for a category of templates associated with a given template. For instance, the category demand factor may represent how in-demand the category of a template is, relative to other categories.

The category demand factor may be time-dependent such that it represents a relative level of demand for a category at a particular time. For example, budget-related templates may be in high-demand at the beginning of the year, while resume templates may be in greater demand at other times of the year. Early in the year, templates associated with a budget category would annotated with a category demand factor of greater weight relative to the category demand factor given to templates in the resume category. Later in the year, templates in the resume category would be annotated with a category demand factor of greater weight relative to the category demand factor given to templates in the budget category, and so on.

In some implementations, the templates service may customize the templates included in the gallery set on a per-request basis as each request of the requests for the gallery set occurs. For example, the templates may be re-ranked based on request-specific factors, such as the identity of a user or the market from where a request originates, a history of template usage associated with the user, which templates the user previously viewed or save, or what category of templates the user is interested in.

It may be appreciated that the enhanced curating technology disclosed herein may also apply to other situations where content is rendered in a gallery. For example, an online application store could apply the principals disclosed herein when curating an application gallery.

The technology disclosed herein may also be employed by local applications entirely or in part to curate template galleries. In some implementations, a local application may receive a curated gallery set and could further-curate the set based on local factors known to the application. In other implementations, a local application could receive a non-curated (or semi-curated) set of annotated templates and could curate the templates locally using the principals disclosed herein.

Referring to FIG. 1, operational architecture 100 is disclosed for curating templates. Operational architecture 100 includes computing system 101, on which local application 103 is executed. Local application 103 communicates with templates service 123, which executes on computing system 121. Templates service 123 also communicates with administrative application 133, executing on computing system 131.

Local application 103 is representative of any software application capable of receiving template galleries from a templates service and presenting the galleries in a user interface. Local application 103 may be a stand-alone application or it may be implemented in a distributed manner as multiple applications. In addition, local application 103 may be a natively installed application, a browser-based application that executes in the context of a browser, a streaming application, or any other type of application, including any combination or variation thereof. Examples include, but are not limited to, productivity applications, such as word processing, spreadsheet, document editing, and presentation applications.

Templates service 123 is representative of any software application or collection of applications capable of providing a templates service to local applications. Templates service 123 may be implemented within the context of another service, such as an online productivity service (such as Office365® offered by Microsoft®, or Google Docs® offered by Google®), an app store service, a multi-media service, or any other type of service that curates templates for local applications to display. In some implementations, templates service 123 may be implemented as a stand-alone service or a distributed service.

In some implementations, local application 103 may be an application store application that provides a user interface to an online application store, or app store. In such situations, local application 103 would request, receive, and present graphical representations of application titles available in the app store, as opposed to templates. An online service would curate a gallery of application titles, as opposed to templates, and would provide icons or other graphical representations of the titles for presentation by location application 103.

Figure 9:
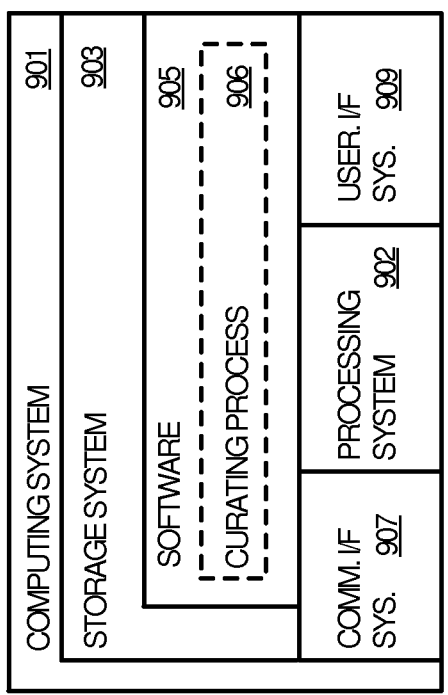
FIG. 9 illustrates a computing system suitable for implementing any of the architectures, processes, and operational scenarios disclosed herein with respect to the Figures and discussed below in the Technical Disclosure.

Local application 103 executes on computing system 101, which is representative of any physical or virtual computing system, device, or collection thereof capable of hosting local application 103 and implementing curating process 300. Examples of computing system 101 include, but are not limited to, smart phones, laptop computers, tablet computers, desktop computers, hybrid computers, gaming machines, smart televisions, virtual machines, and wearable devices, as well as any variation or combination thereof, of which computing system 901 illustrated in FIG. 9 is representative.

Computing system 121 is representative of any physical or virtual computing system, device, or collection thereof capable of hosting templates service 123. Examples of computing system 121 include, but are not limited to, server computers, web servers, application servers, rack servers, blade servers, virtual machine servers, or tower servers, as well as any other type of computing system, of which computing system 901 illustrated in FIG. 9 is representative.

Referring now to the operational scenario illustrated in FIG. 1, personnel review templates that may be produced, procured, or otherwise obtained for distributing to end users. Administrative application 133 is representative of an application or applications that personnel may interface with through user interface 135 in order to view, evaluated, and annotate templates. The templates are annotated with information descriptive of a variety of factors that can be used by templates service 123 when curating the templates. Examples of the factors include, but are not limited to, functional, aesthetic, and demand-related factors.

In some implementations, templates may be evaluated automatically or semi-automatically in order to reduce the effort expended by administrative personnel. For example, an algorithm may be applied to each template that evaluates characteristics of the template against criteria in order to determine how functional a template is or how aesthetically pleasing the template is. The algorithm can automatically produce the demand factors from this evaluation, with which the templates can be annotated.

In a brief example of automated evaluation of templates, the functionality and aesthetics of a template may be algorithmically captured by evaluating various criteria. Example criteria to use when evaluating the functionality of a template include the length of the template, the number of fields that are in the template document, and a count of the number of advanced objects in the template (charts, smart art, tables, and headings). Each functional dimension may be translated in a 0.0-1.0 score. A weighted average may then be calculated from the scores. A further weighted score may be given by a human judge in some examples (again perhaps 0.0-1.0). These sores may again be weighted and summed, thus deriving a single score that is the functional factor for a template.

Example criteria to use when evaluating the aesthetics of a template include the percentage of the thumbnail image of the template that is not white, the largest font size in the template, the degree to which modern fonts are used in the template, the quantity of text in the template, the dominant color of the template, and the size of images included in the template thumbnail. Each dimension may be translated in a 0.0-1.0 score. A weighted average may then be calculated from the scores. A further weighted score may be given by a human judge in some examples (again perhaps 0.0-1.0). Then the scores may be weighted and summed, thus deriving a single score that is the aesthetic factor for a template.

The templates are stored in templates database 127. Templates database 127 is representative of any file store, structured or unstructured database, or other such data repository in which templates may be provisioned. In some implementations templates database 127 may be federated or hosted by a third-party. Templates database 127 may also be implemented as multiple databases in some scenarios. The annotated templates, examples of which include word processing documents, spreadsheets, and presentations, are automatically processed by templates service 123 to select a set for delivery to end-user applications. Templates service 123 employs curating process 200 to select such a gallery set, which is described in more detail below with respect to FIG. 2.

Local applications request the gallery set from templates service 123 upon being launched, when a user navigates from within an application to a gallery view, or in response to other events and triggers. In this operational example, local application 103 communicates a request to templates service 123, in response to which templates service 123 replies with the aforementioned gallery set. In some implementations, further customizing of the gallery set may be performed by templates service 123.

Local application 103 receives the gallery set from templates service 123, which may include the actual templates or just graphical representations (e.g. icons and thumbnail images) of the templates. In some implementations, merely a list of the templates may be returned by templates service directing local application 103 to obtain one or more of the templates from a different location other than from templates service 123. Local application 103 renders the graphical representations of the templates through user interface 105 per curating process 300, which is described in more detail below with respect to FIG. 3. Gallery view 107 includes icons 111, 112, 113, 114, 115, and 116, which are examples of graphical representations of the templates in the gallery set.

Figure 2:
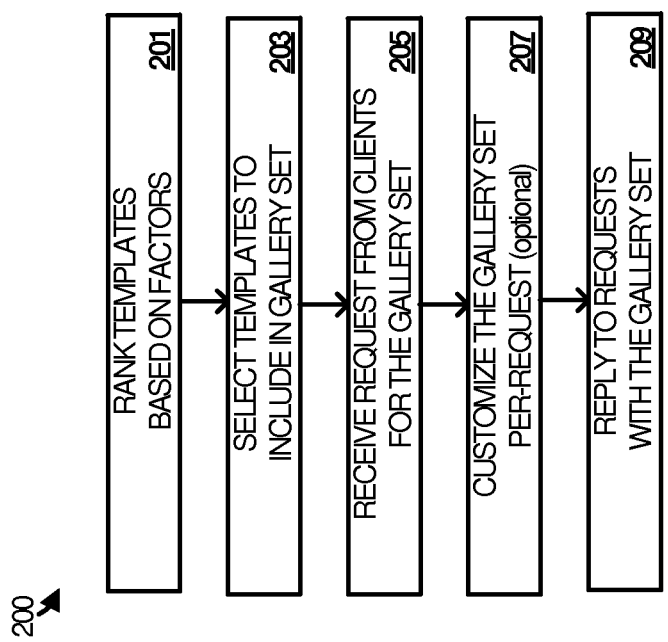
FIG. 2 illustrates a curating process in an implementation.

FIG. 2 illustrates curating process 200 in an implementation. Curating process 200 is representative of the functional steps that may be carried out by any software program, module, or collections thereof employed by templates service 123 when curating templates. Curating process 200 may be implemented in program instructions executable by computing system 121. The following discussion of curating process 200 refers parenthetically to the steps illustrated the flow chart.

When employing curating process 200 to organize a template gallery, template service 123 ranks a collection of templates based on the variety of factors annotated with respect to the templates (step 201). As mentioned above, the factors include, but are not limited to, a functional factor, an aesthetic factor, and a demand factor associated with each template. The factors may be represented in terms of an alpha-numeric score, a numerical score, a weight, a code, or some other comparative representation.

The functional and aesthetic factors are considered in order to balance what types of templates are included in a gallery set. For example, a given template can be annotated to describe that it is a predominantly functional template that lacks aesthetic appeal. In another example, a given template can be annotated to describe that it is a predominantly aesthetically pleasing template, as opposed to a very functional template. The templates can be annotated with such evaluations in metadata that is integrated with each template. Alternatively, the factors may be stored in a list or database in association with an identity of each template. A number of ways to annotate the templates are possible and may be considered within the scope of the present disclosure.

In addition to the annotated factors, a randomized factor is also considered when ranking the templates. The randomized factor is utilized to introduce variety into the gallery set. Without the randomized factors, the same set of templates might be selected repeatedly, in which case end-users would be presented with a static selection of templates in their gallery. Furthermore, the demand analytics for these templates may be skewed in a self-reinforcing loop. With the randomized factors, templates that might otherwise be excluded from a gallery set may be included.

Ranking the templates can occur on a periodic or substantially periodic basis. For instance, the templates may be ranked on a monthly, weekly, or daily basis. New randomized factors are generated each time the templates are ranked. However, the templates are evaluated by personnel and annotated only occasionally relative to how often the ranking occurs. For instance, a template may be evaluated by personnel and annotated when it is first created and introduced into templates database 127. The templates can be re-evaluated and re-annotated as necessary, although this is optional.

Once the templates have been ranked, templates service 123 determines which templates to include in the gallery set based on their position in the ranking (step 203). A collection of templates could include dozens, hundreds, or even thousands of templates- or even more. Thus, a subset is selected from the collection of templates for inclusion in the gallery set. A given gallery set may include a quantity of templates in the single digits, dozens of templates, or even more. While the gallery set includes only a subset of the entire collection, it may be appreciated that the entire collection may still be available for end-users to browse, search, select from, and otherwise access.

In some implementations, templates service 123 may also determine an arrangement of the templates in the gallery set based on their respective functional, aesthetic, and other factors. For example, templates service 123 may arrange the templates in a gallery set in a specific so as to balance out the distribution of functional and aesthetic templates. Other factors may also be considered, such as the balance of categories in a gallery and color diversification across a viewable gallery.

Requests for the gallery set are received by template service 123 on an ongoing basis (step 205). The requests originate from local application 103 and other local applications. While operational architecture 100 illustrates just one local application, it may be appreciated that template service 123 may operate at-scale and may be capable of serving a quantity of end-users and local applications in the tens of millions or more.

In some implementations, template service 123 may optionally customize the gallery set on a per-request basis (step 207). The customization may occur based on any of a variety of request-specific factors, such as a user identity associated with a request or the particular market from which a request originates, for example. Certain behaviors may be known and associated with a user identity, which can be leveraged to customize a gallery. For example, a user's past template queries, past template downloads, and usage of the specific features within a template may drive such customization. Examples of customizing the gallery set include substituting some templates for others based on the request-specific factors (re-ranking) and shrinking or enlarging the size of the gallery set. In some embodiments, a template profile may be created and maintained on a per-user basis. Such a user-specific template profile would describe an optimal template for that user in terms of functionality, aesthetics, and other factors. This profile could be compared against the profile for each template in a collection and the comparison used when customizing a gallery set.

Template service 123 replies to the requests with the gallery set (step 209). In some cases, the actual templates may be downloaded to the local applications. The local applications would then render graphical representations of the templates (e.g. icons or thumbnail images) in a gallery view. In other cases, just the icon or thumbnail representations of the templates are downloaded. Should a user select a given template, then the local application could request the full template document from template service 123. In still other cases, a list of templates or template links may be downloaded to the local applications, directing the local applications to another destination to obtain the templates.

Figure 3:
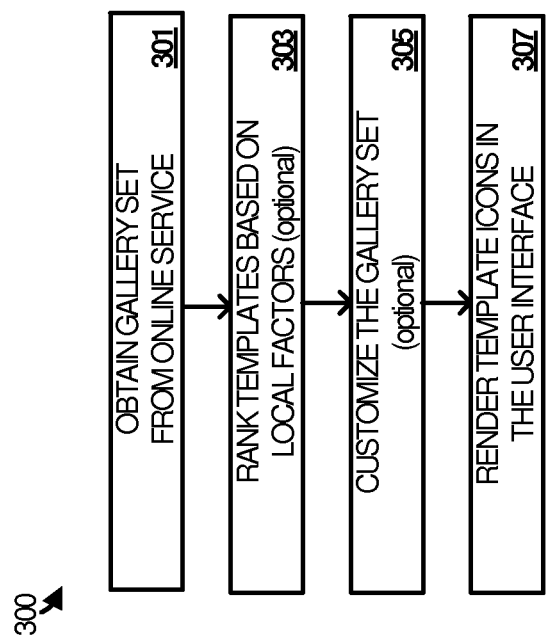
FIG. 3 illustrates a curating process in an implementation.

FIG. 3 illustrates curating process 300 in an implementation. Curating process 300 is representative of the functional steps that may be carried out by any software program, module, or collections thereof employed by local application 103 in order to present a template gallery. Curating process 300 may be implemented in program instructions executable by computing system 101. The following discussion of curating process 300 refers parenthetically to the steps illustrated the flow chart.

Local application 103 first communicates with templates service 123 to obtain a gallery set (step 301). The gallery set may be fully curated by templates service 123, in that no other modifications or customizations are made to it by local application 103. Under such circumstances, local application 103 renders the template icons associated with the gallery set in user interface 105 (jump to step 307).

However, in some implementations local application 103 may be capable of re-ranking the gallery set based on local factors (step 303). Examples of local factors that might be considered by local application 103 include a context of the user's behavior, an identity of the user, a historical usage pattern associated with the user, and the like. A user's profile or identity may be leveraged to identify templates downloaded by other users with similar attributes in their identity.

The gallery set can then be customized based on the re-ranking (step 305). Customizing the gallery set may include adding other templates to the set, removing some templates from the set, or re-ordering the templates in the set. Other customizations are possible and may be considered within the scope of the present disclosure.

Once the gallery set has been customized, local application 103 renders the icons, thumbnails, or other such graphical representations of the templates in gallery view 107. The user may select any of the icons to launch or preview the actual template.

Figure 4:
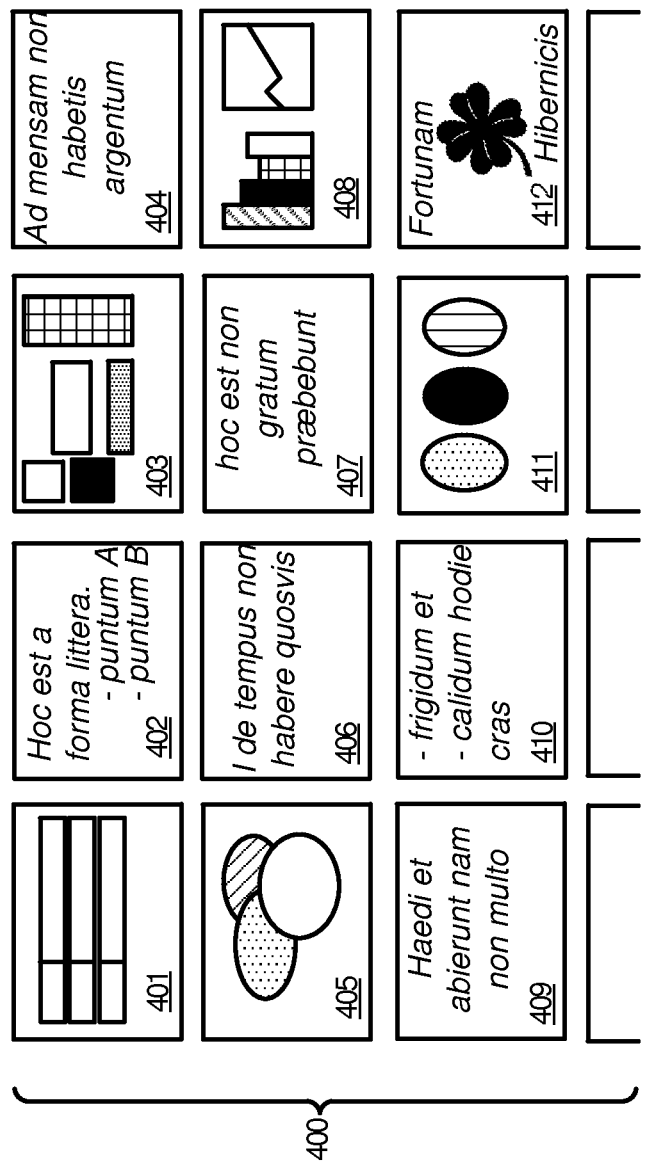
FIG. 4 illustrates collection of templates in an implementation.

FIG. 4 illustrates a templates collection 400 in an implementation. Templates collection 400 is representative of a collection of templates from which a gallery set may be selected by templates service 123. Templates collection 400 includes some templates with various levels of functionality and aesthetic quality. Templates service 123 employs curating process 200 to identify and select a subset of templates that, in the aggregate, have a balance between highly functional templates and aesthetically pleasing templates.

Templates collection 400 includes templates 401-412. Either manually, automatically, or semi-automatically, the functionality and aesthetic qualities of each template is ascertained. Through a rating process that considers the input of one or more people or computationally applied algorithms, a determination is arrived at with respect to each template in templates collection 400. The template is then annotated with a functional rating (that reflects how functional the template is) and an aesthetic rating (that reflects how aesthetically pleasing the template is).

FIG. 5A includes a table 500 that illustrates sample functional and aesthetic ratings or scores for the templates in templates collection 400. Table 500 also illustrates a preliminary rank for each template relative to the others when the functional score and aesthetic score for each template is summed. Furthermore, table 500 includes a random number score for each template. The random number score is an example of a randomizing factor that is used to introduce variety into a gallery set.

In this example scenario, the scale for the functional score is from 0.0 to 1.0, as is the scale for the aesthetic score. The scale for the random number is also 0.0 to 1.0. Summing all three scores produces a final score. Weight the scores may occur in some implementations. Comparing the preliminary rankings (determined from the preliminary scores) against the final rankings (determined from the final scores) demonstrates how a randomizing factors assists with maintaining variety in the set.

In FIG. 5A, it is assumed for exemplary purposes that the top six templates are selected for inclusion in the gallery set. The preliminary ranking—which excludes the random score—includes template 408 ($1^{st}$), template 403 ($2^{nd}$), template 401 ($3^{rd}$), template 411 ($4^{th}$), template 404 ($5^{th}$), and template 407 ($6^{th}$).

After the random number is included in the score and a final rank is determined, the gallery set includes template 408 ($1^{st}$), template 403) ($2^{nd}$), template 407 ($3^{rd}$), template 405 ($4^{th}$), template 411 ($5^{th}$), and template 404 ($6^{th}$). The randomizing factor thus contributed to exclusion of template 401 from the set and the inclusion of template 405.

Figure 5B:
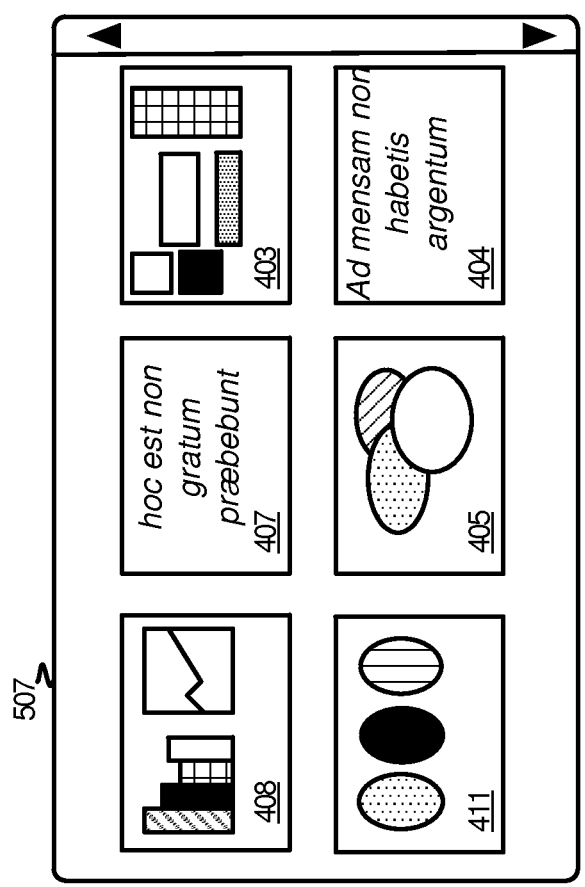
FIG. 5B illustrates a gallery view in an implementation.

FIG. 5B illustrates how the gallery set selected in FIG. 5A may be presented in a gallery view 507. In some implementations, each template may be displayed per its order in the ranking. However, either templates service 123 or local application 103 could re-order the gallery set based on request-specific factors. For example, the gallery set could be re-ordered to more evenly distribute aesthetically pleasing templates throughout a splash screen. In another example, templates that relate to a subject matter that is especially important to an end-user could be shifted to a more prominent position in the gallery.

Thus, in FIG. 5B the gallery set is displayed in the following order: template 408, template 407, template 403, template 411, template 405, and template 404. In other words, the order in which the templates are displayed in the gallery view need not corresponding precisely (or at all) to their position in the ranking.

Figure 6A:
FIG. 6A illustrates a table used to rank templates in an implementation.

As the table 500 in FIG. 5A illustrates one iteration of rankings, table 600 in FIG. 6A illustrates another iteration of the rankings. Changing the random numbers on each iteration of ranking supports variety in the gallery set. The annotated scores in table 600 remain the same relative to table 500. However, the random number scores assigned to teach template change. Accordingly, the final score associated with each template changes.

The gallery set in FIG. 6A includes template 403 ($1^{st}$), template 404 ($2^{nd}$), template 408 ($3^{rd}$), template 401 ($4^{th}$), template 407 ($5^{th}$), and template 409 ($6^{th}$). By comparison to the gallery set in FIG. 5A, the gallery set in FIG. 6A includes four templates in common and two new templates.

Figure 6B:
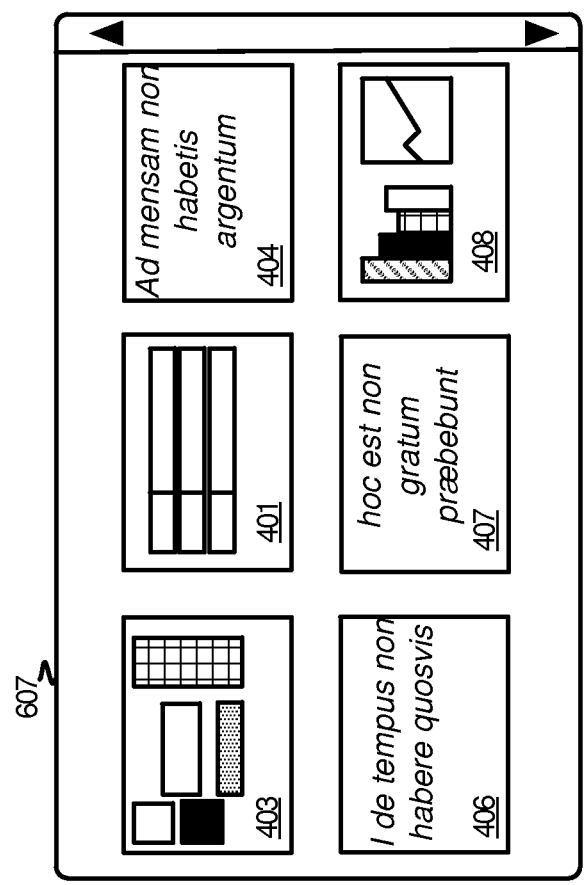
FIG. 6B illustrates a gallery view in an implementation.

FIG. 6B illustrates how the gallery set selected in FIG. 6A may be presented in a gallery view 607. In some implementations, each template may be displayed per its order in the ranking. But as mentioned, either templates service 123 or local application 103 could re-order the gallery set based on request-specific factors. For example, the gallery set could be re-ordered to more evenly distribute aesthetically pleasing templates throughout a splash screen. In another example, templates that relate to subject matter that is especially important to an end-user could be shifted to a more prominent position in the gallery. Thus, in FIG. 6B the gallery set is displayed in the following order: template 403, template 401, template 404, template 406, template 407, and template 408.

Figure 7:
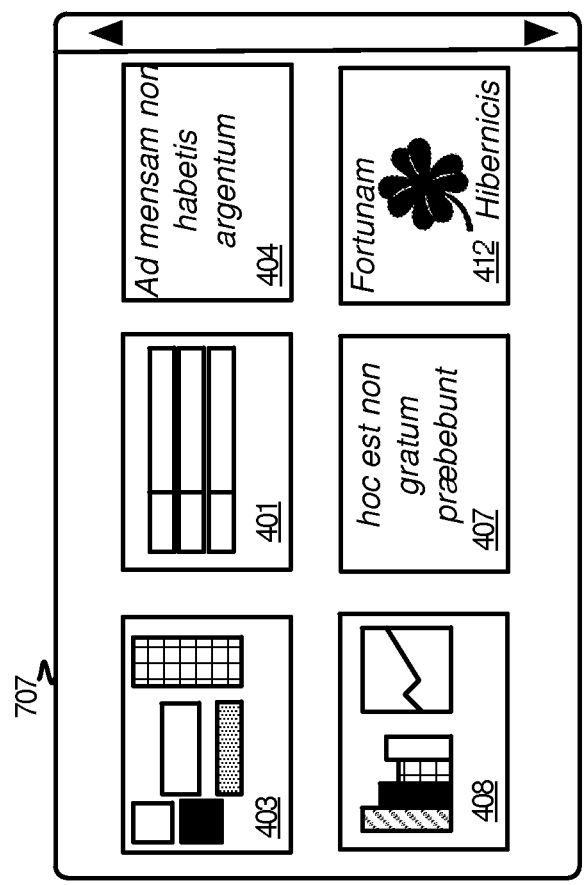
FIG. 7 illustrates a gallery view in an implementation.

FIG. 7 illustrates gallery view 707 in an implementation. Gallery view 707 illustrations a customization of the gallery set that may occur irrespective of the rankings determined by templates service 123. The gallery set may be customized based on a variety of factors, such as request-specific factors and demand factors.

In this example, template 412 is substituted for template 406, even though template 412 is neither in the top six in the preliminary ranking nor in the top six in the final ranking. Rather, templates service 123 or local application 103 may include template 412 due to demand reasons, such as an observed historical demand for that template on a particular day (e.g. Valentine's Day cards from February $10^{th}$ through February $14^{th}$). In another example, template 412 could be included in the gallery set due to historical usage data associated with a particular user.

The discussion above with respect to FIG. 5A through FIG. 7 provides a highly simplified explanation of how templates may be ranked and selected for display in a gallery view. In other implementations, the scoring and ranking of templates may occur dynamically as templates are selected for inclusion in a gallery view. Weighting may be dynamically applied to the functional and aesthetic factors annotated with respect to each template to ensure that a given template gallery is well-balanced between highly functional templates and highly aesthetic templates.

For instance, if a more aesthetic template is chosen for slot one in a gallery view, then the weights of each score are altered when considering the second template. Thus if the default weight for each score is 1×, when considering the second slot, a weight of 1.2× is applied to the functional score of templates, while a weight of 0.8× is applied for the aesthetic score. It is still possible that a second aesthetic template is chosen for the second slot, but now the weights for each score for the third slot are biased even more heavily (e.g. 1.4×) for the functional scores when selecting the third slot. A running total of how many aesthetic templates relative to how many functionally high-scoring templates are chosen is maintained, and this determines how much to weight the functional and aesthetic scores on templates.

A similar approach may be used for categories. A running list of categories may be maintained (e.g. budget, holiday, business . . . ) and each category has an inherent weighting based on the overall historic demand for that category and the weight given today's date. If the first slot is filled with a certain category (e.g. business) then all candidate templates which are of the business category will receive a slight penalty when they are being ranked for the second slot. The more that templates from the business category are chosen, the less likely it is than additional business category templates will fill the remaining slots for the template gallery.

Color diversity may also be balanced across a gallery set in this manner. A resulting gallery set will thus be automatically balanced with respect to functionality, aesthetics, category representation, and color diversity.

An alternative mechanism would be to create two lists of templates, one sorted by functionality and one sorted by aesthetics. The top template from one or the other list could then be selected based on a probability weighting. For instance, if it is desired that a template gallery be evenly distributed between functional and aesthetic templates, then the selection process could alternate between the lists. If the weighting defines an unbalanced relationship between functional and aesthetic templates, then the templates could be selected from the two lists in an unbalanced manner. In yet another example, a clustering algorithm could be employed to divide the templates in a collection into groups with similar properties. Templates could then be selected from the groups for inclusion in a gallery.

Figure 8:
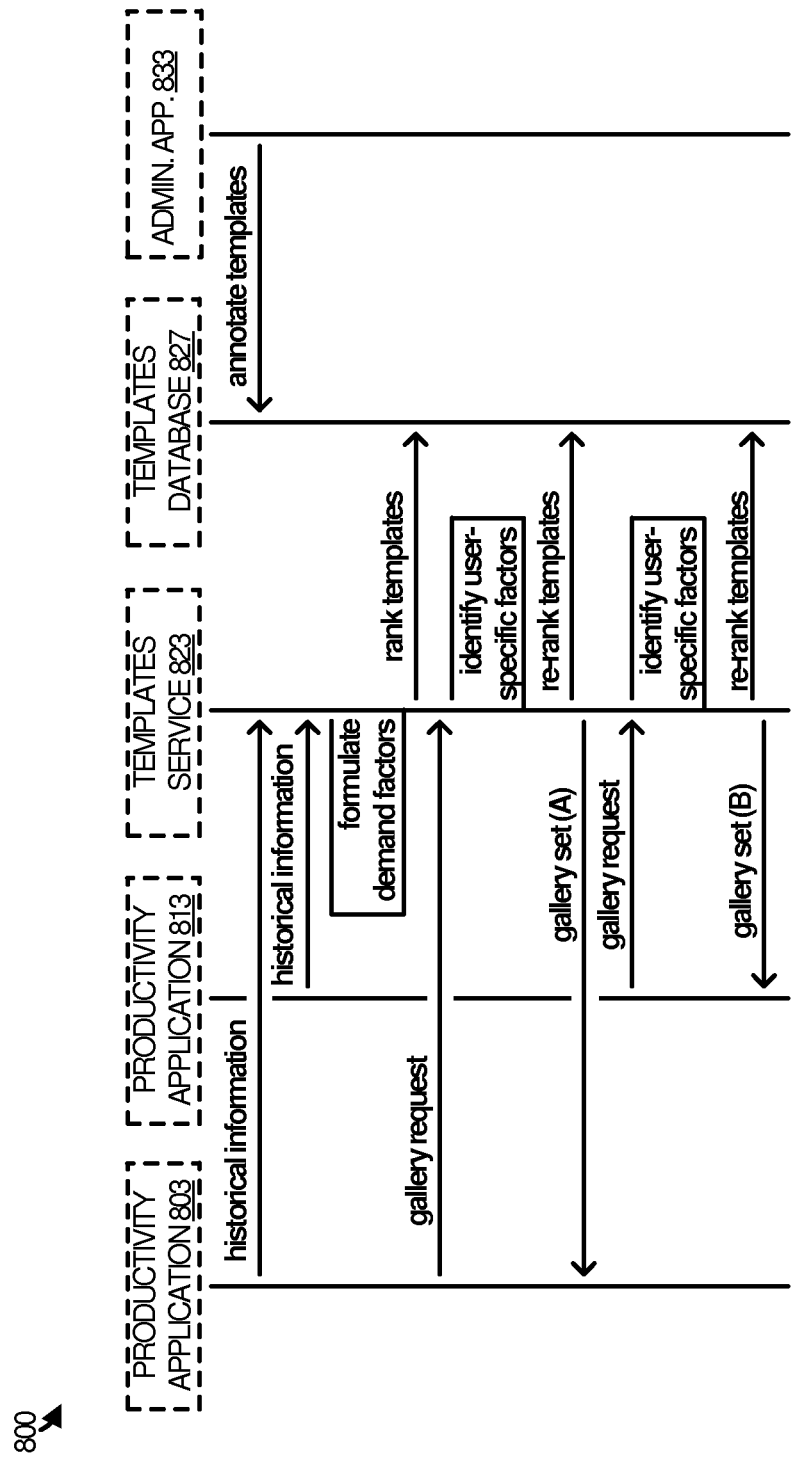
FIG. 8 illustrates an operational scenario in an implementation.

FIG. 8 illustrates an operational scenario 800 in an implementation. In operational scenario 800, personnel (a single person or a team of people) using administrative application 833 rate templates and annotate the templates with the ratings. The annotated templates are stored in templates database 827.

Templates service 823 communicates with productivity application 803 to gather historical information related to how templates are used and consumed locally with respect to productivity application 803. Templates service 823 also communicates with productivity application 813 to gather historical information related to how templates are used and consumed locally with respect to productivity application 813.

From the historical information, templates service formulates demand factors. The demand factors indicate, for example, which templates are in demand on a per-time period basis. More precisely, templates service 823 can forecast, on a per-template basis, how much demand exists on a given day for that template. Templates service 823 then ranks the templates using the factors annotated to the templates with the demand factors formulated from the historical information.

Next, productivity application 803 communicates a request for a gallery set to templates service 823. Templates service 823 re-ranks the templates (or a subset of the templates) based on user-specific factors identified for the request. After re-ranking the templates, a gallery set "A" is selected and returned to productivity application 803 for display in a gallery view.

For exemplary purposes, productivity application 813 subsequently communicates a request for a gallery set to templates service 823. Templates service 823 again re-ranks the templates (or a subset of the templates) based on user-specific factors identified for the request from productivity application 813. After re-ranking the templates, a gallery set "B" is selected and returned to productivity application 803 for display in a gallery view. Assuming that the user-specific factors differ between both requests, it may be appreciated that the templates included gallery set "A" differ by at least one from the templates included in gallery set "A". In other words, templates service 823 is capable of selecting and returning request-specific gallery sets.

Various technical effects may be appreciated from the foregoing implementations and examples. Annotating templates with functional factors (e.g. scores) allows for automatic curation of a template gallery. Such automation allows the curating to occur on a more frequent basis than otherwise. For example, a template gallery can be curated on a daily basis, or even on a per-request basis. This may be especially beneficial when employed in the context of a large-scale service with many end-users and requests. Automated or semi-automated algorithmic evaluation and annotation further allows new ranking ingredients to be incorporated as they are discovered or as overall business/aesthetic goals for the template selection evolve.

Enhanced template curation as disclosed herein also provides the technical effect of improving the user experience. By automatically identifying and surfacing a template gallery with a greater balance functional and aesthetically pleasing templates, a user is more likely to find and use a template from the splash screen in the gallery. This may reduce the time it takes the user to find a suitable template and to complete a task. In addition, as the user may perform fewer searches than otherwise, processing resources and communication resources may be conserved.

It may be appreciated from the implementations discussed above that a variety of factors can be considered when curating templates. In other examples, temporal factors may be considered, too. For instance, a user's tasks may change from month to month as they may file their taxes one month, create holiday cards in another, and apply for a job in another. These and other temporal aspects can be factored into the template curation processes described herein. In addition, user specific information may be another factor that might positively influence the choice of templates. If a user is getting married, for instance, that information may factor into what templates are selected. In another example, the newness or freshness of a template may be considered as a factor. The season in which a request is made can be a factor, as can the culture and tastes in a particular market where a request originates. The temporal factors may influence which templates to select on a day-by-day basis, based on historic demand that is observed for the same or similar days in the past.

Structured categorization may be utilized to boost popular categories of templates, which may provide for diversification across categories in a gallery. Business sector templates, education related templates, and home related templates are examples of such categories. What category a template belongs to, which can be annotated to the template, may be considered by a template curating process.

The dominant color of a template is another factor to consider. By factoring in the color of each template, color diversity across a gallery can be provided.

In some implementations, miscellaneous descriptions may be used to qualify a given factor. For instance, if the color of a template is rated as blue, a numeric descriptor could accompany that rating to provide weight or explanation to the blue rating. For instance, a rating of 1-5 (from high to low) could be provided by the descriptor. In another example, if a template's category is rated as business sector, a descriptor could be accompany the rating to give a relative weight to the rating. Thus, the functional ratings used to rank templates can be qualified by descriptors that are also annotated to the templates.

Even the orientation of a subject in a template may be an annotated factor to consider when ranking and selecting templates. For example, if a particular template includes an image of a human face, a descriptor could be annotated to the template to indicate whether it is facing left or right. In the aggregate, such orientation factors could be considered to ensure the attractiveness of a gallery with those templates in it. The orientation factors may be determined algorithmically and reflect observed preferences that that human faces or arrows point inward in the template gallery (which humans find more pleasing) as opposed to facing outside the picture (which is less pleasing). Template orientation (landscape vs. portrait) is yet another factor to annotate to a template.

A separate database may be maintained in some implementations to store date-specific demand for each template. The data may record for each template multiple date-specific data points. Then, for each template in each of various markets, a templates service can calculate the historic download total for at least: (a) all days on average; (b) weekend vs. week days on average; (c) a given day in the week, e.g. average for Mondays; (d) the start/middle/end of month on average; and (e) each day of the year on average.

Such data can also be aggregated across template categories. For instance, historic download for a category can be calculated using the historic download totals for the templates associated with that category. The overall popularity of a given category can factor into the ranking of templates in that category. In addition, categories with surging popularity can be favorably weighted.

For markets without sufficient traffic to generate template-specific demand data or category-related demand data, data from other similar markets can be used instead.

Other information that may be factored into the template selection process includes skip data that describes how often a template is displayed in a gallery, but skipped over by end users. Real-time telemetry in a local application can track and report how often a template is skipped over. Back-end analysis can then determine if a given template is skipped over more than might otherwise be expected. That template can be excluded from future gallery sets as a response, for instance, or optionally penalized when considered for future rankings.

Yet other examples of data that can be annotated onto templates is taken from user profile data combined with download data. Examples of user profile data include the version of software they use (business, education, home). For each user profile type, a templates service may track template downloads (and aggregated, the category downloads). More granular groupings may be identified using web tracking technology to detect preferred websites by the user and/or categories of apps downloaded from App Stores, subject to appropriate privacy control tracking. An annotation on each template may record the average popularity for that profile group. Furthermore, a separate data representation of categories and their average popularity for that profile group can be annotated to the templates.

The following illustrates an example curating algorithm that may be executed by a templates service on a suitable computing system. On a daily basis, template download data and category download data may be published with historic popularity given the day of year, and popularity for each profile group, and skip data. This is normalized into two values—a given category's desirability for that day and a given template's desirability for that day.

Associated time-independent user-independent properties (aesthetics, functionality etc.) are aggregated into a single normalized score per template representing the current inherent desirability of a given template.

In both cases, the actual normalization of the multiple properties into a normalized score is corpus-specific (dependent on the actual preferences for each template by users) and those skilled in the art may use standard machine learning training and feedback techniques to reach a normalized value When the user navigates to a template homepage experience (e.g. File/New in Microsoft® Word®), the user's computer may request a set of templates to show. This information may be further annotated by user specific data. For example, categories of other recently downloaded and/or viewed templates may be included. Also, categories of other recently downloaded and/or viewed apps in the Office Store or Windows Store may be included. These categories may be mapped to the categories using the template store. Categories may also be matched against keywords in users 'most recently used' documents and 'most recently used' templates list.

User preferences based on download history may also be included, such as average preference for aesthetic or functional templates. The propensity to want birthday templates based on birthdays taken from email or social media platform may be identified and included. The propensity to want certain specialized documents (e.g. weddings, resumes) based on recently visiting websites in those domains may be included. In another example, the template usage history of other people associated with a user (i.e. co-workers) may be considered. The functions a user performs most, such as writing a letter, may also be considered.

To ensure user privacy, this information can either be passed up from the (e.g.) local application to the templates service in the form of incoming web service query parameters (which affect the relevance), or the same data can be held locally on the user's machine and be used as a post-processing resorting process.

At this point, the templates service needs to calculate the best set of categories to show. On a daily basis, the following is performed. A random number is added to the merge (using standard machine learning techniques) of the category's inherent popularity, today's popularity and popularity given the user segment. The categories are sorted.

In some implementations, additional entries from the same category can be added if the category's popularity today is particularly high. In other implementations, additional entries from top categories can be added to ensure the most popular categories are well represented, and not overpowered by many niche-need categories. A given category (and/or a specific template) may be manually set (e.g. 'Take the tour of Microsoft Word) so as to always appear in a given position.

Next, the templates service need to calculate the best template to pick for a given category. A random number is added to the merge (using standard machine learning techniques) of the templates' inherent popularity, today's popularity and popularity given the user segment. This list is sorted. Additionally, if the color is non-white and the threshold for that non-white color has gone beyond a threshold of 2 templates, the score for that template is demoted. This score increases if a neighboring template is of the same color. If the template color for the first N templates is predominantly white, then non-white templates receive a boost. This encourages color diversity. If the template is not already selected (for showing in an earlier category), it is selected. Experimentation can also be used to show template X instead of template Y for given users.

Finally, if the template service notices abnormally low clicks for a given template, the system can have a fast update process to ensure a particularly low performing template gets replaced before the day is over.

FIG. 9 illustrates computing system 901 that is representative of any system or collection of systems in which the various operational architectures, scenarios, and processes disclosed herein may be implemented. Examples of computing system 901 include, but are not limited to, smart phones, laptop computers, tablet computers, desktop computers, hybrid computers, gaming machines, virtual machines, smart televisions, smart watches and other wearable devices, as well as any variation or combination thereof. Other examples include server computers, rack servers, web servers, cloud computing platforms, and data center equipment, as well as any other type of physical or virtual server machine, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes curating process 906, which is representative of the curating processes discussed with respect to the preceding FIGS. 1-8, including curating process 200 and curating process 300, as well as the aspects embodied in operational scenario 800.

When executed by processing system 902 to enhance template curating capabilities, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing enhanced template curating.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include curating process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced template curating. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIGS. 4-7 as an example, through the operation of a computing system or systems of which computing system 901 is representative, transformations may be performed with respect to the various scenarios described therein. As an example, templates collection 400 is processed to identify and create a gallery set of templates displayed in gallery view 507. A second iteration of the template curating process results in a different set of templates in gallery view 607, thereby changing the state of the gallery view. Yet another set is provided in gallery view 707. In other words, the enhanced template curating disclosed herein results in a constantly changing state of a gallery view.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

Example 1

A method of operating an online templates service comprising: ranking a collection of templates in an order based on a plurality of factors associated with each template in the collection of templates comprising a functional factor, an aesthetic factor, and a randomizing factor; determining which templates of the collection of templates to include in a gallery set based at least in part on a position of each of the collection of templates in the order; and replying to requests for the gallery set with results comprising graphical representations of the templates included in the gallery set.

Example 2

The method of claim 1 further comprising determining an arrangement of the templates in the gallery set based at least in part on the plurality of factors associated with each of the templates.

Example 3

The method of Examples 1-2 further comprising obtaining a score for each of the collection of templates based on the plurality of factors, wherein ranking the collection of templates in the order based on the plurality of factors comprises ranking the collection of templates in the order based on the score obtained for each of the collection of templates.

Example 4

The method of Examples 1-3 wherein obtaining the score for each of the collection of templates comprises obtaining an initial score based at least in part on the functional factor and the aesthetic factor and adding the randomizing factor to the initial score to produce the score.

Example 5

The method of Examples 1-4 wherein the plurality of factors further comprises a demand factor and wherein for each of the collection of templates, the functional factor comprises a numerical rating representative of a level of functionality provided by the template, the aesthetic factor comprises a numerical rating representative of a level of aesthetic quality achieved by the template, and the demand factor comprises a numerical rating representative of a forecasted level of demand for the template, and wherein the randomizing factor comprises a random number.

Example 6

The method of Examples 1-5 wherein the plurality of factors further comprises a category demand factor and wherein, for each of the collection of templates, the category demand factor comprises a numerical rating representative of a forecasted level of demand for category of templates associated with the template.

Example 7

The method of Examples 1-6 further comprising annotating each of the collection of templates with at least the functional factor associated the template and the aesthetic factor associated with the template prior to ranking the collection of templates.

Example 8

The method of Examples 1-7 further comprising customizing the templates included in the gallery set on a per-request basis as each request of the requests for the gallery set occurs.

Example 9

A method for curating an online application store comprising: ranking a collection of applications in an order based on a plurality of factors associated with each application in the collection of applications comprising a functional factor, an aesthetic factor, a demand factor, and a randomizing factor; determining which applications of the collection of applications to include in a gallery set based at least in part on a position of each of the collection of applications in the order; and replying to requests for the gallery set with results comprising graphical representations of the applications included in the gallery set.

Example 10

The method of Example 9 further comprising obtaining a score for each of the collection of applications based on the plurality of factors, wherein ranking the collection of applications in the order based on the plurality of factors comprises ranking the collection of applications in the order based on the score obtained for each of the collection of applications.

Example 11

The method of Examples 9-10 wherein obtaining the score for each of the collection of applications comprises obtaining an initial score based at least in part on the functional factor, the aesthetic factor, and the demand factor, and adding the randomizing factor to the initial score to produce the score.

Example 12

The method of Examples 9-11 wherein the initial score comprises a value in a range of possible scores and the randomizing factor comprises another value in the range.

Example 13

The method of Examples 9-12 wherein for each of the collection of applications, the functional factor comprises a numerical rating representative of a level of functionality provided by the application, the aesthetic factor comprises a numerical rating representative of a level of aesthetic quality achieved by the application, and the demand factor comprises a numerical rating representative of a forecasted level of demand for the application, and wherein the randomizing factor comprises a random number.

Example 14

The method of Examples 9-13 wherein the plurality of factors further comprises a category demand factor and wherein, for each of the collection of applications, the category demand factor comprises a numerical rating representative of a forecasted level of demand for category of applications associated with the application.

Example 15

The method of Examples 9-14 further comprising annotating each of the collection of applications with at least the functional factor associated the application and the aesthetic factor associated with the application prior to ranking the collection of applications.

Example 16

The method of Examples 9-15 further comprising customizing the applications included in the gallery set on a per-request basis as each request of the requests for the gallery set occurs.

Example 17

An apparatus comprising: one or more computer readable storage media; an application stored on the one or more computer readable storage media and comprising program instructions that, when executed by a processing system, direct the processing system to at least: receive a set of templates from an online template service with which to populate a template gallery in a user interface to the application; determine an arrangement of the template gallery based at least in part on a plurality of factors associated with each of the set of templates comprising a functional factor and an aesthetic factor; and render graphical representations of the set of templates in the user interface in accordance with the arrangement of the template gallery.

Example 18

The apparatus of Example 17 further comprising the processing system that reads and executes the program instructions, wherein for each template of the collection of templates, the functional factor comprises a numerical rating annotated to the template that is representative of a level of functionality provided by the template and the aesthetic factor comprises another numerical rating annotated to the template that is representative of a level of aesthetic quality achieved by the template.

Example 19

The apparatus of Examples 17-18 wherein the plurality of factors further comprise user-specific factors associated with a user of the application.

Example 20

The apparatus of Examples 17-19 wherein each of the set of templates comprises one of a word processing document, a spreadsheet document, and a presentation document.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method of operating an online templates service comprising:
   ranking a collection of templates in an order based on a plurality of factors associated with each template in the collection of templates comprising a functional factor, an aesthetic factor, and a randomizing factor;
   receiving an interaction associated with one or more templates in the collection of templates from a user, wherein the interaction comprises usage of one or more specific features in a template of the collection of templates by the user;
   re-ranking the collection of templates in a second order based on the user's interaction with the one or more templates in the collection of templates;
   determining which templates of the collection of templates to include in a gallery set for the user based at least in part on a position of each of the collection of templates in the second order; and
   replying to requests for the gallery set with results comprising a plurality of user-selectable graphical representations corresponding to a plurality of highest ranked templates, based on the re-ranking, of the collection of templates.

2. The method of claim 1 further comprising determining an arrangement of the templates in the gallery set based at least in part on the plurality of factors associated with each of the templates.

3. The method of claim 1 further comprising obtaining a score for each of the collection of templates based on the plurality of factors, wherein ranking the collection of templates in the order based on the plurality of factors comprises ranking the collection of templates in the order based on the score obtained for each of the collection of templates.

4. The method of claim 3 wherein obtaining the score for each of the collection of templates comprises obtaining an initial score based at least in part on the functional factor and the aesthetic factor and adding the randomizing factor to the initial score to produce the score.

5. The method of claim 4 wherein the plurality of factors further comprises a demand factor and wherein for each of the collection of templates, the functional factor comprises a numerical rating representative of a level of functionality provided by the template, the aesthetic factor comprises a numerical rating representative of a level of aesthetic quality achieved by the template, and the demand factor comprises a numerical rating representative of a forecasted level of demand for the template, and wherein the randomizing factor comprises a random number.

6. The method of claim 5 wherein the plurality of factors further comprises a category demand factor and wherein, for each of the collection of templates, the category demand factor comprises a numerical rating representative of a forecasted level of demand for category of templates associated with the template.

7. The method of claim 1 further comprising annotating each of the collection of templates with at least the functional factor associated the template and the aesthetic factor associated with the template prior to ranking the collection of templates.

8. The method of claim 1 further comprising customizing the templates included in the gallery set on a per-request basis as each request of the requests for the gallery set occurs.

9. A method for curating an online application store comprising:
ranking a collection of applications in an order based on a plurality of factors associated with each application in the collection of applications comprising a functional factor, an aesthetic factor, a demand factor, and a randomizing factor;
receiving an interaction associated with one or more applications in the collection of applications from a user, wherein the interaction comprises usage of one or more specific features in an application of the collection of applications by the user;
re-ranking the collection of applications in a second order based on the user's interaction with the one or more applications in the collection of applications;
determining which applications of the collection of applications to include in a gallery set for the user based at least in part on a position of each of the collection of applications in the second order; and
replying to requests for the gallery set with results comprising a plurality of user-selectable graphical representations corresponding to a plurality of highest ranked applications, based on the re-ranking, of the collection of applications.

10. The method of claim 9 further comprising obtaining a score for each of the collection of applications based on the plurality of factors, wherein ranking the collection of applications in the order based on the plurality of factors comprises ranking the collection of applications in the order based on the score obtained for each of the collection of applications.

11. The method of claim 10 wherein obtaining the score for each of the collection of applications comprises obtaining an initial score based at least in part on the functional factor, the aesthetic factor, and the demand factor, and adding the randomizing factor to the initial score to produce the score.

12. The method of claim 11 wherein the initial score comprises a value in a range of possible scores and the randomizing factor comprises another value in the range of possible scores.

13. The method of claim 12 wherein for each of the collection of applications, the functional factor comprises a numerical rating representative of a level of functionality provided by the application, the aesthetic factor comprises a numerical rating representative of a level of aesthetic quality achieved by the application, and the demand factor comprises a numerical rating representative of a forecasted level of demand for the application, and wherein the randomizing factor comprises a random number.

14. The method of claim 13 wherein the plurality of factors further comprises a category demand factor and wherein, for each of the collection of applications, the category demand factor comprises a numerical rating representative of a forecasted level of demand for category of applications associated with the application.

15. The method of claim 9 further comprising annotating each of the collection of applications with at least the functional factor associated the application and the aesthetic factor associated with the application prior to ranking the collection of applications.

16. The method of claim 9 further comprising customizing the applications included in the gallery set on a per-request basis as each request of the requests for the gallery set occurs.

17. An apparatus comprising:
one or more computer readable storage media;
an application stored on the one or more computer readable storage media and comprising program instructions that, when executed by a processing system, direct the processing system to at least:
receive a set of templates from an online template service with which to populate a template gallery in a user interface to the application, wherein the template gallery is specific to a user;
determine an arrangement of the template gallery based at least in part on a plurality of factors associated with each of the set of templates comprising a functional factor and an aesthetic factor;
receive an interaction associated with one or more templates of the set of templates from a user, wherein the interaction comprises usage of one or more specific features in a template of the set of templates by the user;
rearrange the template gallery based on the user's interaction with the one or more templates in the set of templates; and
reply to requests for the template gallery with results comprising a plurality of user-selectable graphical representations corresponding to a plurality of highest ranked templates of the template gallery based on the rearrangement.

18. The apparatus of claim 17 further comprising the processing system that reads and executes the program instructions, wherein for each template of the set of templates, the functional factor comprises a numerical rating annotated to the template that is representative of a level of functionality provided by the template and the aesthetic factor comprises another numerical rating annotated to the template that is representative of a level of aesthetic quality achieved by the template.

19. The apparatus of claim 17 wherein the plurality of factors further comprise user-specific factors associated with a user of the application.

20. The apparatus of claim 17 wherein each of the set of templates comprises one of a word processing document, a spreadsheet document, and a presentation document.

\* \* \* \* \*